(12) United States Patent
Luo et al.

(10) Patent No.: US 11,415,803 B2
(45) Date of Patent: Aug. 16, 2022

(54) GENERATING A VIRTUAL CONTENT DISPLAY

(71) Applicant: Molecular Imprints, Inc., Austin, TX (US)

(72) Inventors: Kang Luo, Austin, TX (US); Vikramjit Singh, Pflugerville, TX (US); Frank Y. Xu, Austin, TX (US)

(73) Assignee: Molecular Imprints, Inc., Austin, TX (US)

( * ) Notice: Subject to any disclaimer, the term of this patent is extended or adjusted under 35 U.S.C. 154(b) by 38 days.

(21) Appl. No.: 16/591,147

(22) Filed: Oct. 2, 2019

(65) Prior Publication Data
US 2020/0033609 A1    Jan. 30, 2020

Related U.S. Application Data

(63) Continuation of application No. 15/724,670, filed on Oct. 4, 2017, now Pat. No. 10,473,936.
(Continued)

(51) Int. Cl.
*G02B 6/34* (2006.01)
*G02B 27/01* (2006.01)
(Continued)

(52) U.S. Cl.
CPC ....... *G02B 27/0172* (2013.01); *G02B 6/0016* (2013.01); *G02B 6/0035* (2013.01);
(Continued)

(58) Field of Classification Search
CPC .. G02B 6/0016; G02B 6/0035; G02B 6/0036; G02B 6/0078; G02B 6/34;
(Continued)

(56) References Cited

U.S. PATENT DOCUMENTS 3,891,300 A    6/1975  Tsunoda
5,833,517 A *  11/1998 Konda ..................... B24C 1/04
                                                       451/29
(Continued)

FOREIGN PATENT DOCUMENTS

CN    101203802 A    6/2008
CN    101395425 A    3/2009
(Continued)

OTHER PUBLICATIONS

JP Office Action in Japanese Appln. No. 2019-528631, dated Dec. 25, 2020, 6 pages (with English translation).
(Continued)

*Primary Examiner* — Audrey Y Chang
(74) *Attorney, Agent, or Firm* — Fish & Richardson P.C.

(57) ABSTRACT

A method of generating a virtual image, including directing a light beam to a first side of an eyepiece, including transmitting the light beam into a first waveguide of the eyepiece; deflecting, by first diffractive elements of the first waveguide, a first portion of the light beam towards a second waveguide of the eyepiece, the first portion of the light beam associated with a first phase of light; deflecting, by protrusions on the first side of the eyepiece, a second portion of the light beam towards the second waveguide, the second portion of the light beam associated with a second phase of light differing from the first phase; and deflecting, by second diffractive elements of the second waveguide, some of the first and the second portions of the light beam to provide an exiting light beam associated with the virtual image that is based on the first and second phases.

20 Claims, 8 Drawing Sheets

Related U.S. Application Data

(60) Provisional application No. 62/427,984, filed on Nov. 30, 2016.

(51) Int. Cl.
  *F21V 8/00* (2006.01)
  *G02B 27/42* (2006.01)

(52) U.S. Cl.
  CPC ......... *G02B 6/0036* (2013.01); *G02B 6/0078* (2013.01); *G02B 27/4205* (2013.01); *G02B 2027/0125* (2013.01)

(58) Field of Classification Search
  CPC ............ G02B 27/0172; G02B 27/4205; G02B 2027/0125; G02B 27/0944; G02B 5/18; G02B 27/4272
  USPC ................... 359/573, 569, 566; 385/146, 37
  See application file for complete search history.

(56) References Cited

U.S. PATENT DOCUMENTS

| | | | |
|---|---|---|---|
| 5,844,720 A | 12/1998 | Ohara et al. | |
| 8,160,411 B2 | 4/2012 | Levola et al. | |
| 8,213,065 B2 | 7/2012 | Mukawa | |
| 8,467,133 B2 | 6/2013 | Miller | |
| 10,061,124 B2* | 8/2018 | Tervo ................. | G02B 27/0172 |
| 10,473,936 B2 | 11/2019 | Luo et al. | |
| 2005/0041025 A1 | 2/2005 | Masters | |
| 2005/0168986 A1 | 8/2005 | Wegner | |
| 2005/0243561 A1 | 11/2005 | Etori | |
| 2006/0126183 A1* | 6/2006 | Hasman ................ | G02B 5/1809 359/573 |
| 2007/0159845 A1 | 7/2007 | Hirota et al. | |
| 2007/0230216 A1 | 10/2007 | Ite et al. | |
| 2010/0177398 A1 | 7/2010 | Watanabe et al. | |
| 2010/0214659 A1* | 8/2010 | Levola ................. | G02B 27/4272 359/566 |
| 2010/0277803 A1 | 11/2010 | Pockett et al. | |
| 2011/0019874 A1* | 1/2011 | Jarvenpaa ............... | G06F 3/013 382/103 |
| 2013/0257689 A1 | 10/2013 | Hotta et al. | |
| 2013/0258215 A1 | 10/2013 | Kaneda et al. | |
| 2016/0231568 A1 | 8/2016 | Saarikko et al. | |
| 2018/0052501 A1 | 2/2018 | Jones, Jr. et al. | |
| 2018/0149870 A1 | 5/2018 | Luo | |

FOREIGN PATENT DOCUMENTS

| | | |
|---|---|---|
| CN | 101589326 A | 11/2009 |
| CN | 102197322 A | 9/2011 |
| CN | 102472955 A | 5/2012 |
| JP | 2012198391 A | 10/2012 |
| JP | 2019528475 A | 10/2019 |
| KR | 1020160008951 A | 1/2016 |
| TW | 201543077 A | 11/2015 |
| WO | WO9952002 A1 | 10/1999 |
| WO | WO2016020630 A2 | 2/2016 |
| WO | WO2016083800 A1 | 6/2016 |

OTHER PUBLICATIONS

KR Office Action in Korean Appln. No. 10-2019-7019066, dated Dec. 8, 2020, 17 pages (with English translation).
TW Search Report in Taiwan Appln. No. 106138067, dated Jan. 7, 2021, 2 pages (with English translation).
CN Office Action in Chinese Appln. No. 201780073910.4, dated Jan. 21, 2021, 7 pages.
Extended European Search Report in European Appln. No. 17877044.2, dated Dec. 2, 2019, 10 pages.
International Search Report and Written Opinion for Application No. PCT/US2017/055038, dated Dec. 11, 2017, 12 pages.
PCT International Preliminary Report on Patentability in International Appln. No. PCT/US2017/055038, dated Jun. 13, 2019, 8 pages.
KR Notice of Allowance in Korean Appln. No. 10-2019-7019066, dated Feb. 23, 2021, 3 pages (with English translation).
Office Action in European Appln. No. 17877044.2, dated May 23, 2022, 9 pages.

* cited by examiner

GENERATING A VIRTUAL CONTENT DISPLAY

CROSS-REFERENCE TO RELATED APPLICATION

This application is a continuation of U.S. application Ser. No. 15/724,670, filed on Oct. 4, 2017, which claims the benefit of the filing date of U.S. Provisional Application No. 62/427,984, filed on Nov. 30, 2016. The contents of U.S. Application No. 62/427,984 and Ser. No. 15/724,670 are incorporated herein by reference in their entirety.

TECHNICAL FIELD OF THE INVENTION

This invention relates to generating a virtual image display.

BACKGROUND OF THE INVENTION

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user.

SUMMARY OF THE INVENTION

Innovative aspects of the subject matter described in this specification may be embodied in a method for generating a virtual image, including directing a light beam to a first side of an eyepiece, including transmitting the light beam into a first waveguide of the eyepiece; deflecting, by one or more first diffractive elements of the first waveguide, a first portion of the light beam towards a second waveguide of the eyepiece, the first portion of the light beam associated with a first phase of light; deflecting, by two or more protrusions positioned on the first side of the eyepiece, a second portion of the light beam towards the second waveguide of the eyepiece, the second portion of the light beam associated with a second phase of light differing from the first phase; and deflecting, by one or more second diffractive elements of the second waveguide, some of the first and the second portions of the light beam to provide an exiting light beam associated with the virtual image, the exiting light beam based on the first and the second phases.

Other embodiments of these aspects include corresponding systems and apparatus configured to perform the actions of the methods.

The features further include, for example, the second portion of the light beam is deflected by the two or more protrusions having a pattern to minimize a striation of the virtual image by the exiting light beam. The second portion of the light beam is deflected by the two or more protrusions having a pattern density to minimize a striation of the virtual image by the exiting light beam. The two or more protrusions are cylindrical, and wherein the second portion of the light beam is deflected by the two or more protrusions having a diameter to minimize a striation of the virtual image by the exiting light beam. The diameter of the two or more protrusions is between 10 and 900 microns. The second portion of the light beam is deflected by the two or more protrusions having a height to minimize a striation of the virtual image by the exiting light beam. The height of the two or more protrusions is between 10 and 500 nanometers.

Innovative aspects of the subject matter described in this specification may be embodied in an optical projection eyepiece include a first side configured to receive a light beam; first and second waveguides, the first waveguide including one or more first diffractive elements configured to deflect a first portion of the light beam towards the second waveguide, the first portion of the light beam associated with a first phase of light; and two or more protrusions positioned on the first side of the eyepiece and arranged to deflect a second portion of the light beam towards the second waveguide of the eyepiece, the second portion of the light beam associated with a second phase of light differing from the first phase; wherein the second waveguide includes one or more second diffractive elements configured to deflect some of the first and the second portions of the light beam to provide an exiting light beam associated with a virtual image and based on the first and the second phases.

The features further include, for example, the two or more protrusions have a pattern to minimize a striation of the virtual image by the exiting light beam. The two or more protrusions have a pattern density to minimize a striation of the virtual image by the exiting light beam. The two or more protrusions are cylindrical, and have a diameter to minimize a striation of the virtual image by the exiting light beam. The diameter of the two or more protrusions is between 10 and 900 microns. The two or more protrusions have a height to minimize a striation of the virtual image by the exiting light beam. The height of the two or more protrusions is between 10 and 500 nanometers. A first subset of the two or more protrusions is associated with a first geometric structure and a second, differing subset of the two or more protrusions is associated with a second, differing geometric structure. The two or more protrusions have a grating pattern. A first subset of the two or more protrusions is associated with a first index of refraction and a second, differing subset of the two or more protrusions is associated with a second, differing index of refraction. The first waveguide, the second waveguide, or both, are associated with a phase, polarization, or both, of the two or more protrusions.

The details of one or more embodiments of the subject matter described in this specification are set forth in the accompanying drawings and the description below. Other potential features, aspects, and advantages of the subject matter will become apparent from the description, the drawings, and the claims.

DETAILED DESCRIPTION

Figure 1:
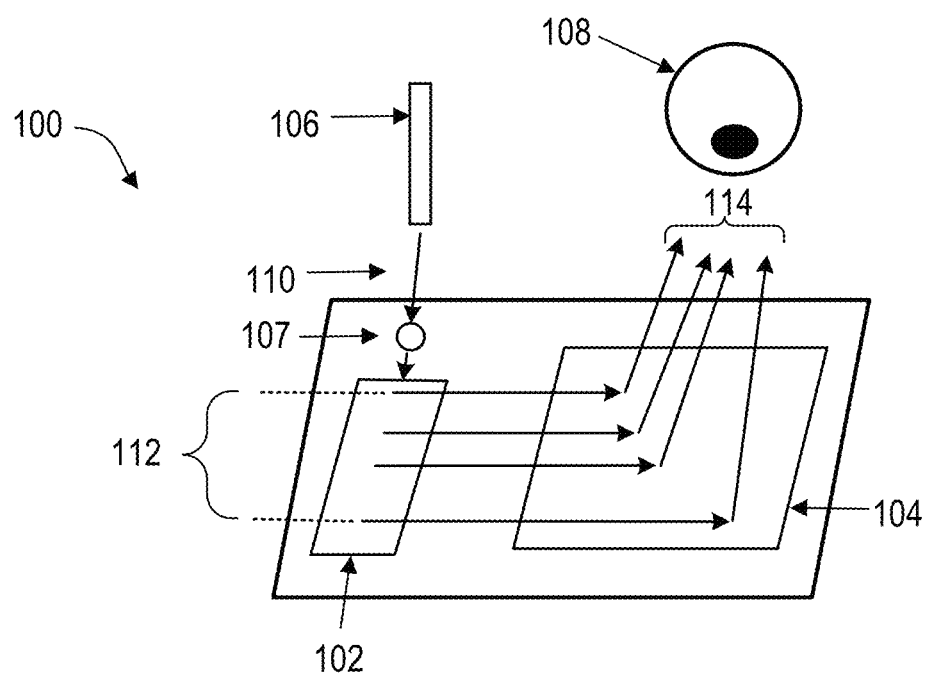
FIG. 1 illustrates an optical projection eyepiece system for generating a virtual content display.

FIG. 1 illustrates an optical projection eyepiece system 100 for generating a virtual content display. The system 100 includes a first waveguide 102, a second waveguide 104, a light producing element 106, and an in-coupling grating (ICG) 107. In general, the waveguides 102, 104 propagate a light beam (image information) from the light producing element 106 to an observer's eye(s) 108. Specifically, the light producing element 106 generates the light beam 110 carrying the image information and enters the ICG 107. The ICG 107 includes a diffractive element that deflects the light beam 110 to the first waveguide 102. The first waveguide 102 includes orthogonal pupil expansion (OPE) diffractive elements and deflects a portion of the light beam 110 to the second waveguide 104 as deflected light 112. The second waveguide 104 receives the deflected light 112. The second waveguide 104 includes exit pupil expansion (EPE) diffractive elements and deflects a portion of the deflected light 112 to the observer's eye(s) 108 as exiting light 114. In some examples, a remaining portion of the deflected light 112 moves through the second waveguide 104 through total internal reflection (TIR).

In some examples, the exiting light 114 is divided into a number of related light beams that exit the second waveguide 104 at a plurality of locations that results in the exiting light 114 including a uniform collimated beam. In some examples, based on the diffraction pattern of the EPE diffractive elements of the second waveguide 104, the exiting light 114 can include linear or divergent exiting light 114.

Figure 2:
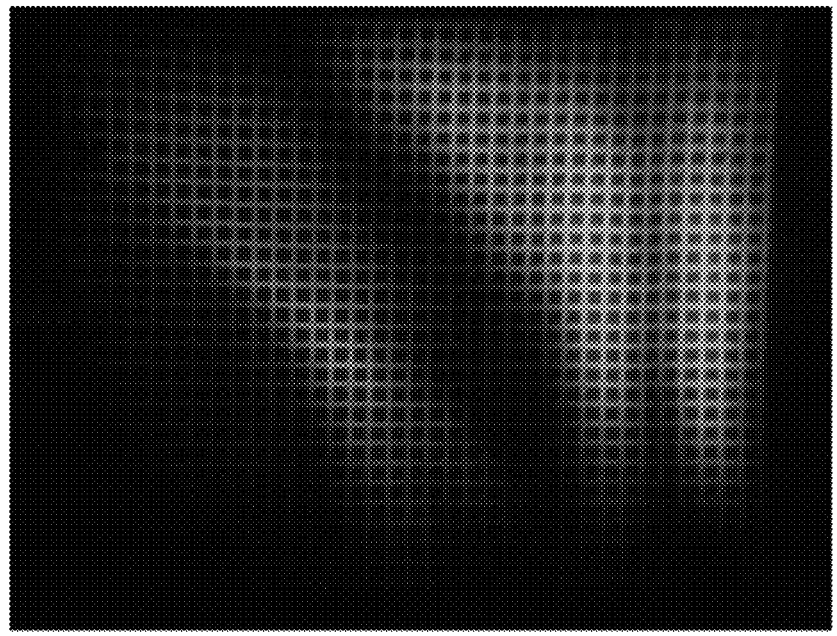
FIG. 2 illustrates a virtual image.

Referring to FIG. 2, a virtual image 200 is shown. Specifically, the exiting light 114 can be associated with the virtual image 200, including the image information associated with the exiting light 114 that forms at least a part of the virtual image 200. However, the virtual image 200 associated with the exiting light 114 can include dark and/or bright striations resulting from light interferences within the exiting light 114. Specifically, the striations of the virtual image 200 can result from the interface of multiple lights beams of the exiting light 114. In some examples, when two or more light beams of the exiting light 114 are out of phase, the light intensity of the exiting light 114 is reduced through destructive interface. In some examples, when two or more light beams of the exiting light 114 are in phase, the light intensity of the exiting light 114 is increased through constructive interface. As a result of such destructive and constructive interface of the exiting light 114, the virtual image 200 includes the dark and/or bright striations.

Figure 3:
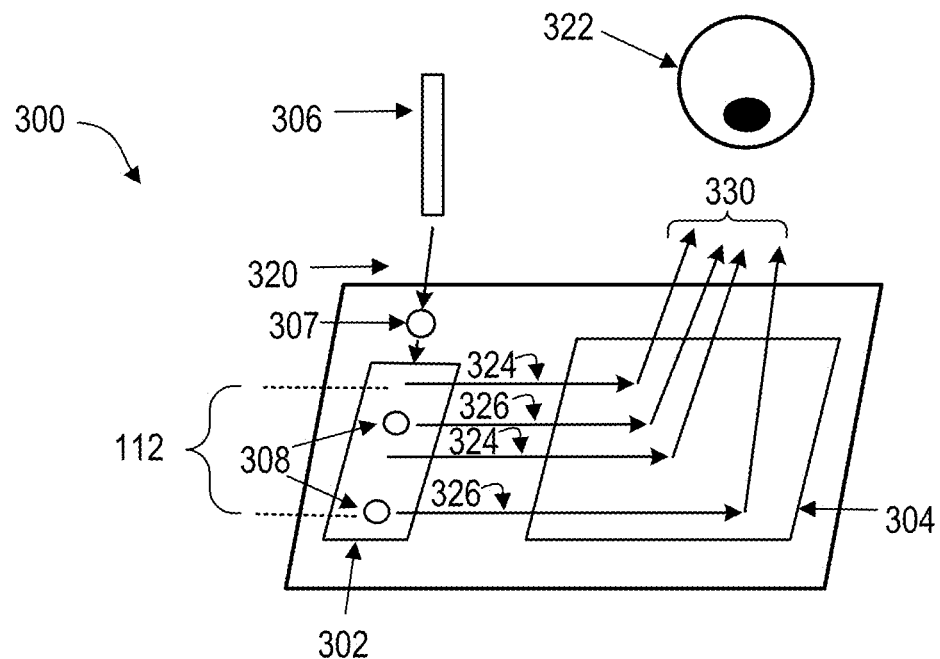
FIG. 3 illustrates a side view of the optical projection eyepiece system for generating a virtual content display.

FIG. 3 illustrates a top view of an optical projection eyepiece system 300 for generating a virtual content display. Specifically, the system 300 minimizes striations of a virtual image (e.g., the virtual image 200) generated by the system 300 that is associated with an exiting light 330. The system 300 includes a first waveguide 302, a second waveguide 304, a light producing element 306, and an ICG 307. The first waveguide 302 includes protrusions 308.

Figure 4:
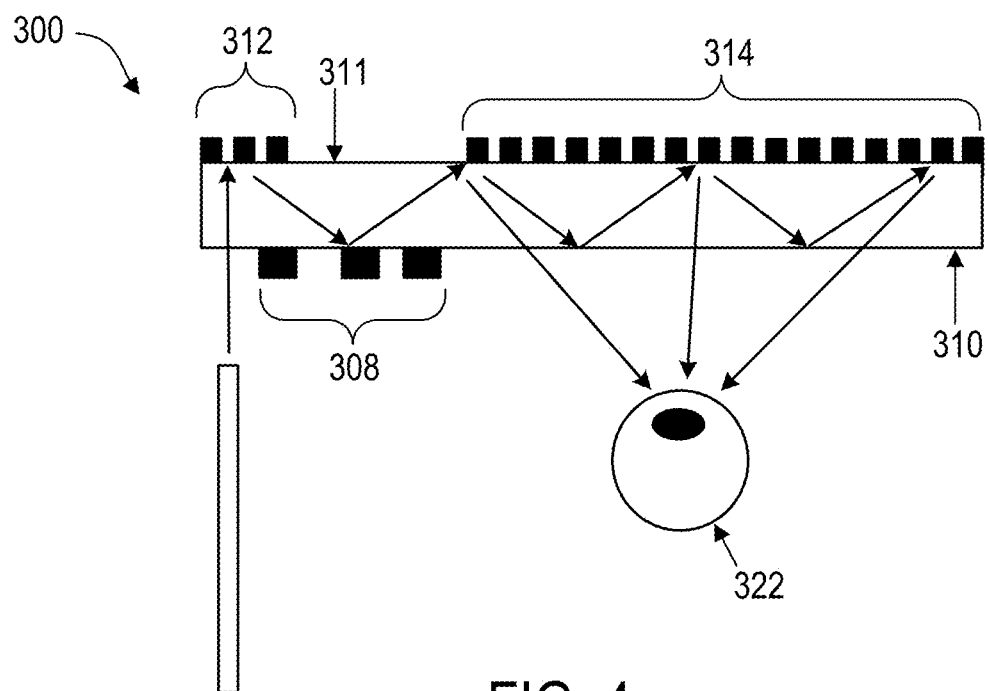
FIG. 4 illustrates a top view of the optical projection eyepiece system for generating a virtual content display.

FIG. 4 illustrates a side view of the optical projection eyepiece system 300. The system 300 includes a first side 310 positioned opposite a second side 311, the first waveguide 302 includes diffractive elements 312, and the second waveguide 304 includes diffractive elements 314. In some examples, the diffractive elements 312 include OPE diffractive elements and the diffractive elements 314 include EPE diffractive elements. In some examples, the protrusions 308 are positioned on the first side 310, the second side 311, or both.

In some examples, the protrusions 308 facilitate adding a random distraction to the light beams of the exiting light 330 that are associated with the virtual image to reducing the degree of coherence of the exiting light 330. As a result, interface among multiple light beams of the exiting light 330 is reduced, if not minimized, and reasonable uniform light intensity is provided without sacrificing image quality (distortion and blur) of the virtual image, described further below.

In some implementations, a light beam 320 is directed to the first side 310 of the eyepiece 300. That is, the light producing element 306 generates the light beam 320 and directs the light beam 320 to the first side 310 of the eyepiece 300. In some examples, directing the light beam 320 to the first side 310 of the eyepiece includes the light producing element 306 transmitting the light beam 320 to the ICG 307. In some examples, the light beam 320 includes image information associated with a virtual image that is to be perceived by an observer's eye(s) 322. The ICG 307 deflects the light beam 320 to the first waveguide 302.

In some implementations, the diffractive elements 312 of the first waveguide 302 deflect a first portion of the light beam 320 towards the second waveguide 304, shown as deflected light 324. In some examples, the deflected light 324 is associated with a first phase of light. In some examples, the first phase of light of the deflected light 324 is substantially the same as a phase of light of the light beam 320. That is, the diffractive elements 312 and the first waveguide 302 maintain the phase of light of the light beam 320. In some examples, the first phase of light of the deflected light 324 differs from the phase of light of the light beam 320. That is, the diffractive elements 312 and the first waveguide 302 adjust the phase of light of the light beam 320.

In some implementations, the protrusions 308 of the first waveguide 302 deflect a second portion of the light beam 320 towards the second waveguide 304, shown as deflected light 326. In some examples, the deflected light 326 is associated with a second phase of light. In some examples, the second phase of light of the deflected light 326 is different from the first phase of light of the deflected light 324.

In some examples, as a result of such deflection by the protrusions 308, the protrusions 308 adjust a phase of light of the light beam 320, shown as deflected light 326 and the second phase of light. In some examples, the protrusions 308 de-coherent the light beam 320 to mitigate an interference pattern between the deflected light 324 and the deflected light 326. To that end, several parameters of the protrusions 308 can be adjusted (e.g., tuned) to minimize, if not prevent, the striations of the virtual image (e.g., the virtual image 200) and obtain a balance between image quality of the virtual image and the striations. That is, the protrusions 308 are associated with parameters such that upon deflection of the light beam 320 by the protrusions 308, the deflected light 326 is associated with a desired second phase of light to minimize an interference pattern between the deflected light 324 and the deflected light 326, and as a result, minimize the striation of the virtual image. In some examples, the protrusions 308 are associated with parameters based on the first phase of light of the deflected light 324 and/or the phase of light of the light beam 320 to minimize an interference pattern between the deflected light 324 and the deflected light 326, and as a result, minimize the striation of the virtual image.

In some examples, the protrusions 308 are associated with a pattern to minimize the striation of the virtual image (e.g., the virtual image 200) by the exiting light 330. In some examples, the pattern of the protrusions 308 is randomized. In some examples, the pattern of the protrusions 308 is geometric, e.g., circular or hexagonal. In some examples, the pattern of the protrusions 308 is associated with a density, and the pattern density of the protrusions 308 minimizes the striation of the virtual image by the exiting light 330. The pattern density of the protrusions 308 can include a quantity of the protrusions 308 included by the first waveguide 302, or any sub-portion of the first waveguide 302. That is, differing regions of the first waveguide 302 can include differing densities of protrusions 308 to minimize the striation of the virtual image by the exiting light 330.

In some examples, the protrusions 308 are of one or more geometric shapes to minimize the striation of the virtual image (e.g., the virtual image 200) by the exiting light 330. In some examples, a subset of the protrusions 308 are of a first geometric shape and the remaining protrusions 308 are of a different geometric shape. In some examples, the protrusions 308 can include any number of subsets each associated with a differing shape. In some examples, the geometric shapes can include cylindrical, cubic, conic, pyramid, or any three-dimensional shape. In some examples, when the protrusions 308 (or any subset thereof) include cylindrical protrusions 308, the diameter of the cylindrical protrusions is between 10 and 900 microns.

In some examples, the protrusions 308 have a height to minimize a striation of the virtual image (e.g., the virtual image 200) by the exiting light 330. In some examples, the protrusions 308 can be associated with two or more subsets each associated with a differing height. In some examples, the height of the protrusions 308 is between 10 and 500 nanometers.

In some examples, one or more of the protrusions 308 are associated with different structures, such as pyramid, square pillar, circular pillar, or multiple step structures. These structures are associated with a different median light refractive index such that upon deflection of the light beam 320 by the protrusions 308, the deflected light 326 is associated with a desired polarization of light to minimize an interference pattern between the deflected light 324 and the deflected light 326, and as a result, minimize the striation of the virtual image.

In some examples, the second waveguide 304 receives the deflected light 324, 326 from the first waveguide 302. In some implementations, the diffractive elements 314 of the second waveguide 304 deflect some of the deflected light 324, 326 towards the observer's eye(s) 332, shown as the exiting light 330. In some examples, the exiting light 330 is based on the deflected light 324, 326, and specifically, based on the first and the second phases of light of the deflected light 324, 326, respectively. That is, the phase of light of the exiting light 330 is based on the first and the second phases of light of the deflected light 324, 326, respectively. In some examples, the exiting light 330 is based on a superposition of the deflected light 324, 326, and further, the phases of light of the exiting light 330 is based on a superposition of the deflected light 324, 326.

Figure 5:
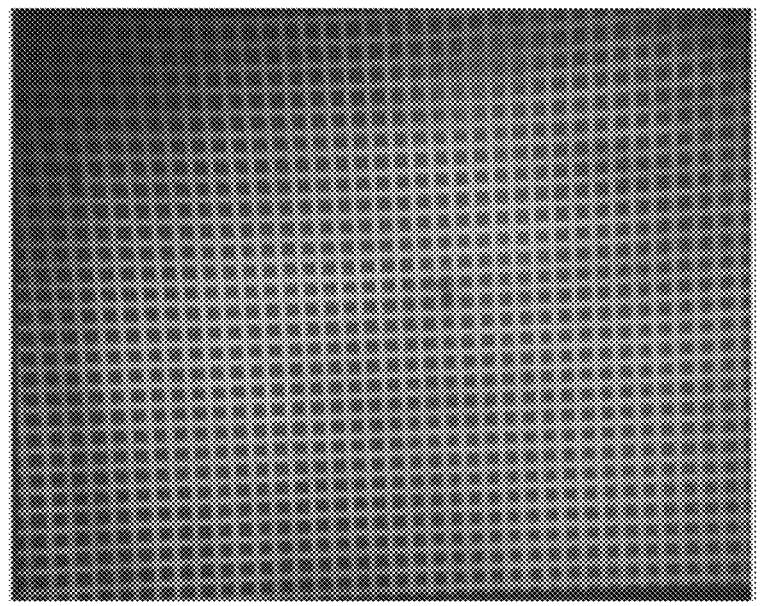
FIG. 5 illustrates a virtual image.

To that end, the phase of light of the exiting light 330 minimizes, if not prevents, striations of the virtual image (e.g., the virtual image 200). Specifically, the phase of light of the deflected light 324, 326 is adjusted (e.g., the parameters of the protrusions 308) to obtain a desired optical interference between the deflected light 324, 326. As a result of such, desired optical characteristics of the exiting light 330, e.g., the phase of light, are obtained to minimize, if not prevent, the striation of the virtual image, as shown in FIG. 5 as a virtual image 500.

In some examples, the exiting light 330 includes image information that is divided into a number of related light beams that exit the second waveguide 304 to form the virtual image 500.

Figure 6:
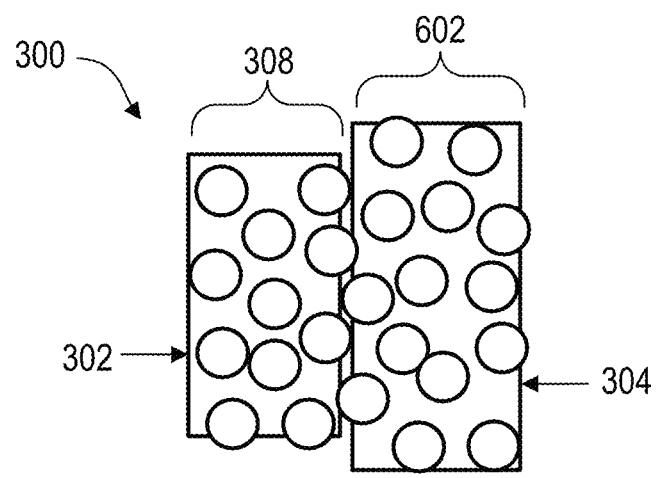
FIGS. 6, 7, 11*a*, 11*b*, and 12 illustrate a bottom view of the optical projection eyepiece system for generating a virtual content display.

Referring to FIG. 6, a bottom view of the optical projection eyepiece system 300 is shown. In some examples, the first waveguide 302 includes protrusions 308 and the second waveguide 304 include protrusions 602, similar to the protrusions 308. Specifically, the protrusions 602 of the second waveguide 304 deflect some of the deflected light 324, 326 towards the observer's eye(s) 322 that is different that the light deflected by the diffractive elements 314 of the second waveguide 304. Thus, the exiting light 330 includes portions of light deflected by the diffractive elements 314 and the protrusions 602.

In some examples, the deflected light 324 that is deflected by the protrusions 602 is associated with a third phase of light. That is, the portion of the light beam 320 that is deflected by the diffractive elements 312 of the first waveguide 302 is further deflected by the protrusions 602. In some examples, third phase of the light deflected by the protrusions 602 is different from the first phase of light of the deflected light 324 or the second phase of light of the deflected light 326.

In some examples, the deflected light 326 that is deflected by the protrusions 602 is associated with a fourth phase of light. That is, the portion of the light beam 320 that is deflected by the protrusions 308 of the first waveguide 302 is further deflected by the protrusions 602. In some examples, the fourth phase of the light deflected by the protrusions 602 is different from the first phase of light of the deflected light 324, the second phase of light of the deflected light 326, and/or the third phase of light of the deflected light 324 that is deflected by the protrusions 602.

To that end, the parameters of the protrusion 602 can be adjusted (e.g., tuned) similar to that as the protrusion 308 to minimize, not prevent, the striation of the virtual image (e.g., the virtual image 200) and obtain a balance between image quality of the virtual image and the striation. That is, the protrusions 602 are associated with parameters such that upon deflection of the deflected light 324, 326 by the protrusions 602, the light deflected by the protrusions 602 is associated with a desired third and/or fourth phases of light to minimize an interference pattern between the deflected light 324, 326 that is further deflected by the protrusions 602, and as a result, minimize the striation of the virtual image.

In some examples, the exiting light 330 is based on the deflected light 324, 326, and the deflected light 324, 326 that is further deflected by the protrusions 602, and specifically, based on the first and the second phases of light of the deflected light 324, 326, respectively, and based on the third and the fourth phases of light of deflected light 324, 326 that is further deflected by the protrusions 602. That is, the phase of light of the exiting light 330 is based on the first and the second phases of light of the deflected light 324, 326, respectively, and the third and the fourth phases of light of the deflected light 324, 326 that is further deflected by the protrusions 602. In some examples, the exiting light 330 is based on a superposition of the deflected light 324, 326, and the deflected light 324, 326 that is further deflected by the protrusions 602 and further, the phases of light of the exiting light 330 is based on a superposition of the deflected light 324, 326 and the deflected light 324, 326 that is further deflected by the protrusions 602.

To that end, the phase of light of the exiting light 330 minimizes, if not prevents, striations of the virtual image (e.g., the virtual image 200). Specifically, the phase of light of the deflected light 324, 326 and the deflected light 324, 326 that is further deflected by the protrusions 602 is adjusted (e.g., the parameters of the protrusions 308, 602) to obtain a desired optical interference between the deflected light 324, 326 and the deflected light 324, 326 that is further deflected by the protrusions 602. As a result of such, desired optical characteristics of the exiting light 330, e.g., the phase of light, are obtained to minimize, if not prevent, the striation of the virtual image.

Figure 7:
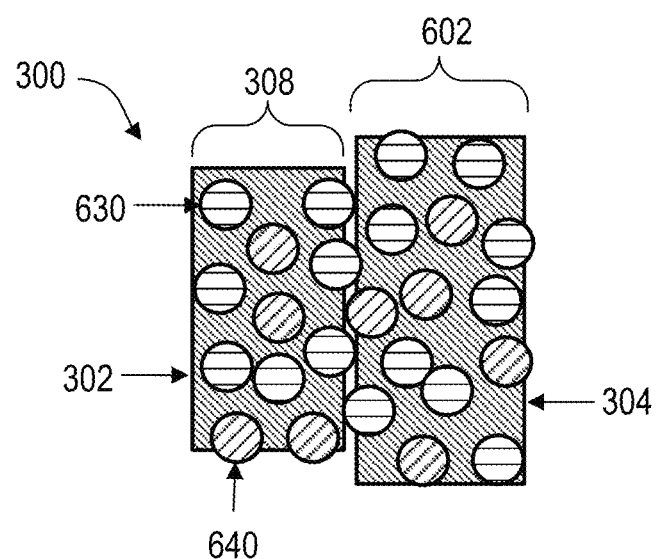

Referring to FIG. 7, a bottom view of the optical projection eyepiece system 300 is shown. Specifically, the protrusions 308, 602 include a grating pattern. The grating pattern can provide birefringence to the exiting light beam 330, and further provide de-coherence of the exiting light beam 330. In some examples, any subset of the protrusions 308 can include the grating pattern. In some examples, the grating pattern can differ for one or more subsets of the protrusions 308.

In some examples, a subset of the protrusions 308 are associated with different structures. As shown in FIG. 7, a first set of the protrusions 308 are associated with a first grating orientation 630 and a second set of the protrusions is associated with a second grating orientation 640 differing from the first grating orientation 630. The combination of the first grating orientation 630 and the second grating orientation 640 can modify the polarization of the light beam 320 and minimize an interference pattern between the deflected light 324 and the deflected light 326, and as a result, minimize the striation of the virtual image. That is, the protrusions 308 are associated with a different median light refractive index such that upon deflection of the light beam 320 by the protrusions 308, the deflected light 326 is associated with a desired polarization of light to minimize an interference pattern between the deflected light 324 and the deflected light 326, and as a result, minimize the striation of the virtual image. In some examples, the first grating orientation 630 and/or the second grating orientation 640 can include lines and spaces with 100-150 nanometer pitch, 20-70 nanometer line width, and 50-150 nanometer height.

In some examples, one or more of the protrusions 308 are associated with varying refractive indices, e.g., from 1.52 to 1.62. For example, the first set of protrusions 308 is associated with a first refractive index and the second set of protrusions 308 is associated with a second refractive index.

In some examples, the phase and/or polarization of the protrusion 308 (and/or the protrusions 602) can be extracted from the protrusions 308. The extracted phase or polarization function can be integrated into the design of OPE 102 and EPE 104. In some examples, the first side 310 is absent (or independent of) the protrusions 308.

Figure 11A:
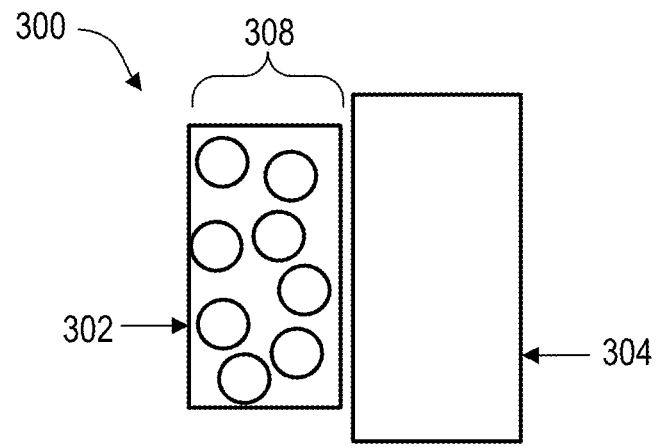
Figure 11B:
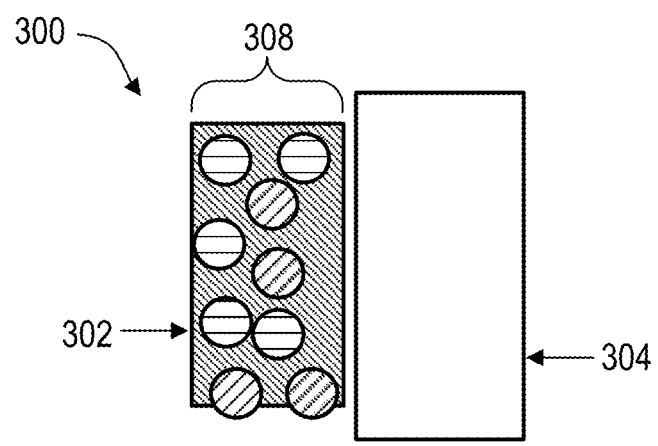
Figure 12:
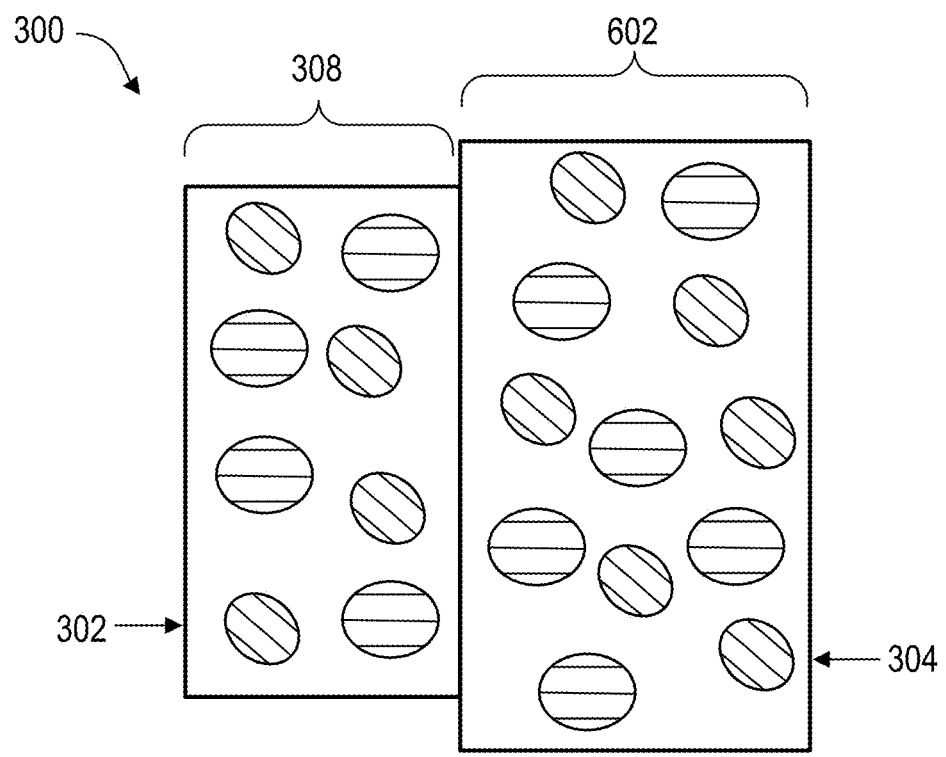

In some examples, the second waveguide 304 of the optical projection eyepiece system 300 is absent (or independent) of protrusions (e.g., protrusions 602) and only the first waveguide 302 includes protrusions 308, as shown in FIGS. 11a and 11b. In some examples, the protrusions 308 of the first waveguide 302 and/or the protrusions 602 the second waveguide 304 are ellipsoidal, as shown in FIG. 12.

Figure 8:
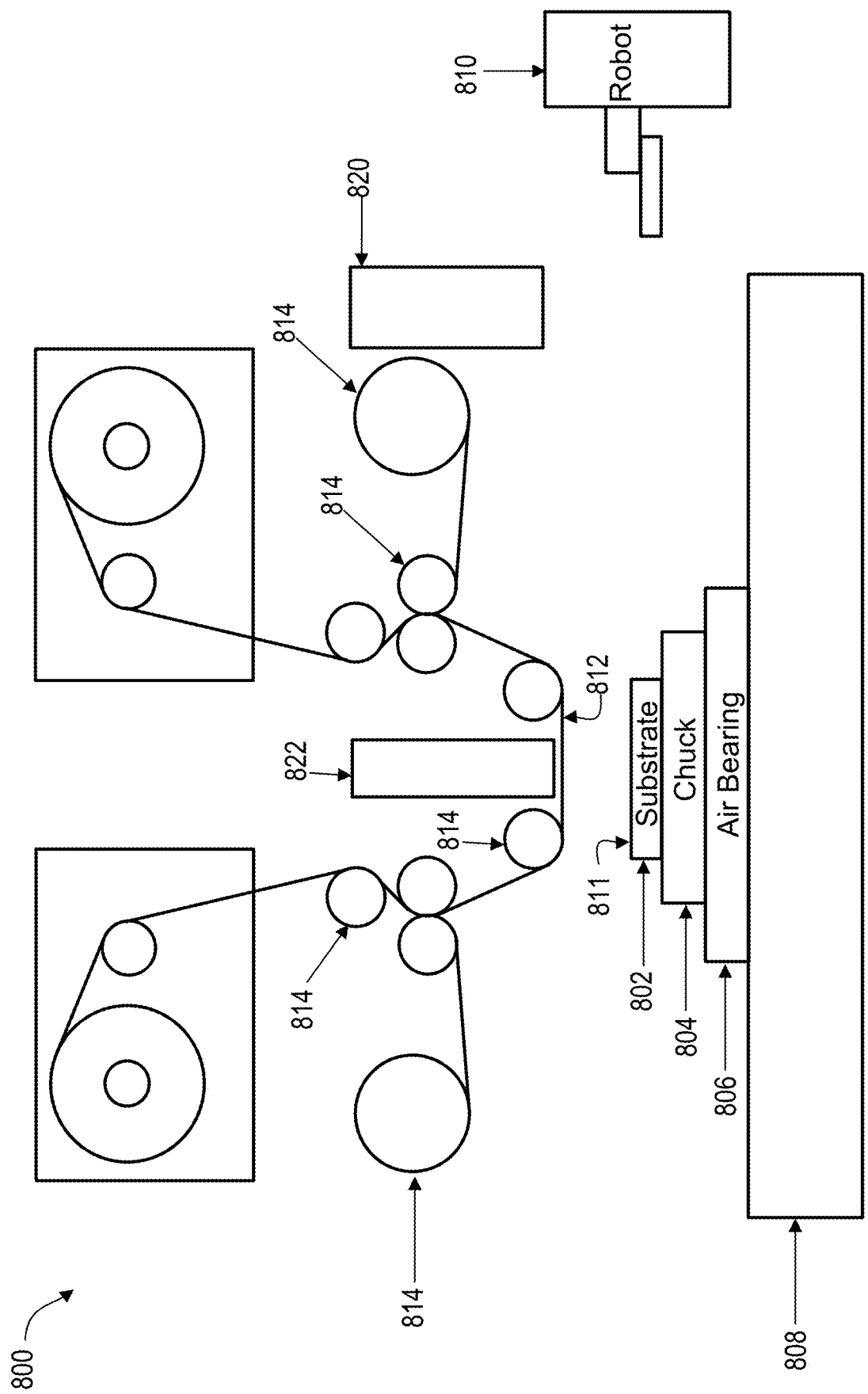
FIG. 8 illustrates a simplified side view of a lithographic system.

In some implementations, the protrusions 308 (and/or protrusions 602) can be formed using any lithography processing. In some examples, the protrusions 308, 602 are formed using imprint lithography. Specifically, FIG. 8 illustrates an imprint lithography system 800 that forms a relief pattern on a substrate 802. In some examples, the substrate 802 can include the first waveguide 302 and/or the second waveguide 304. The substrate 802 may be coupled to a substrate chuck 804. In some examples, the substrate chuck 804 can include a vacuum chuck, a pin-type chuck, a groove-type chuck, an electromagnetic chuck, and/or the like. In some examples, the substrate 802 and the substrate chuck 804 may be further positioned on an air bearing 806. The air bearing 806 provides motion about the x-, y-, and/or z-axes. In some examples, the substrate 802 and the substrate chuck 804 are positioned on a stage. The air bearing 806, the substrate 802, and the substrate chuck 804 may also be positioned on a base 608. In some examples, a robotic system 180 positions the substrate 802 on the substrate chuck 804.

The substrate 802 can include a planar surface 811 positioned opposite the substrate chuck 804. In some examples, the substrate 802 can be associated with a thickness that is substantially uniform (constant) across the substrate 802.

The imprint lithography system 800 further includes an imprint lithography flexible template 812 that is coupled to one or more rollers 814, depending on design considerations. The rollers 814 provide movement of a least a portion of the flexible template 812. Such movement may selectively provide different portions of the flexible template 812 in superimposition with the substrate 802. In some examples, the flexible template 812 includes a patterning surface that includes a plurality of features, e.g., spaced-apart recesses and protrusions. However, in some examples, other configurations of features are possible. The patterning surface may define any original pattern that forms the basis of a pattern to be formed on substrate 802. That is, the patterning surface may form the protrusions 308, 602 on the first waveguide 302 and/or second waveguide 304, respectively. In some examples, the flexible template 812 may be coupled to a template chuck, e.g., a vacuum chuck, a pin-type chuck, a groove-type chuck, an electromagnetic chuck, and/or the like.

The imprint lithography system 800 may further comprise a fluid dispense system 820. The fluid dispense system 820 may be used to deposit a polymerizable material on the substrate 802. The polymerizable material may be positioned upon the substrate 802 using techniques such as drop dispense, spin-coating, dip coating, chemical vapor deposition (CVD), physical vapor deposition (PVD), thin film deposition, thick film deposition, and/or the like. In some examples, the polymerizable material is positioned upon the substrate 802 as a plurality of droplets.

Figure 9:
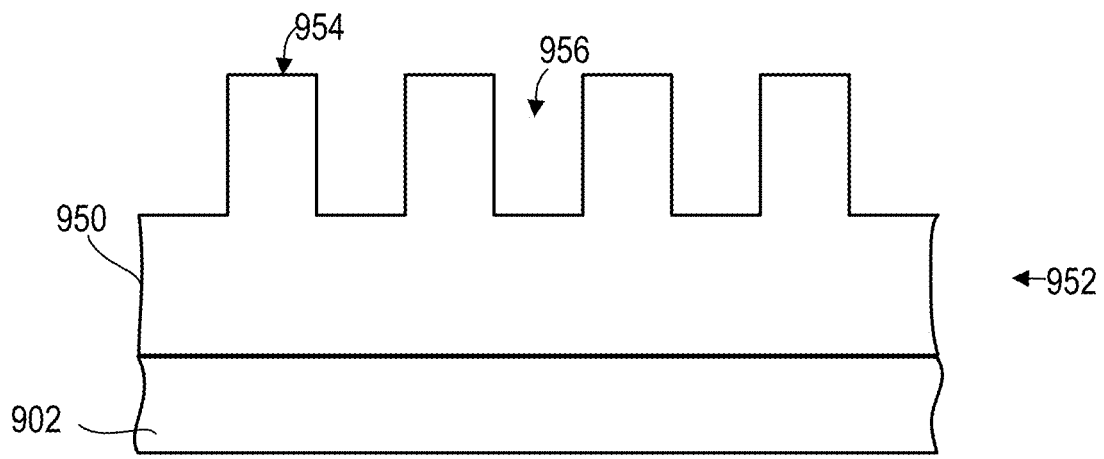
FIG. 9 illustrates a simplified side view of a substrate having a patterned layer positioned thereon.

Referring to FIGS. 8 and 9, the imprint lithography system 800 may further comprise an energy source 822 coupled to direct energy towards the substrate 802. In some examples, the rollers 814 and the air bearing 806 are configured to position a desired portion of the flexible template 812 and the substrate 802 in a desired positioning. The imprint lithography system 800 may be regulated by a processor in communication with the air bearing 806, the rollers 814, the fluid dispense system 820, and/or the energy source 822, and may operate on a computer readable program stored in a memory.

In some examples, the rollers 814, the air bearing 806, or both, vary a distance between the flexible template 812 and the substrate 802 to define a desired volume therebetween that is filled by the polymerizable material. For example, the flexible template 812 contacts the polymerizable material.

After the desired volume is filled by the polymerizable material, the energy source 822 produces energy, e.g., broadband ultraviolet radiation, causing the polymerizable material to solidify and/or cross-link conforming to shape of a surface of the substrate 802 and a portion of the patterning surface of the flexible template 822, defining a patterned layer 950 on the substrate 302. In some examples, the patterned layer 950 may comprise a residual layer 952 and a plurality of features shown as protrusions 954 and recessions 956. In some examples, the protrusions 954 include the protrusions 308, 602.

Figure 10:
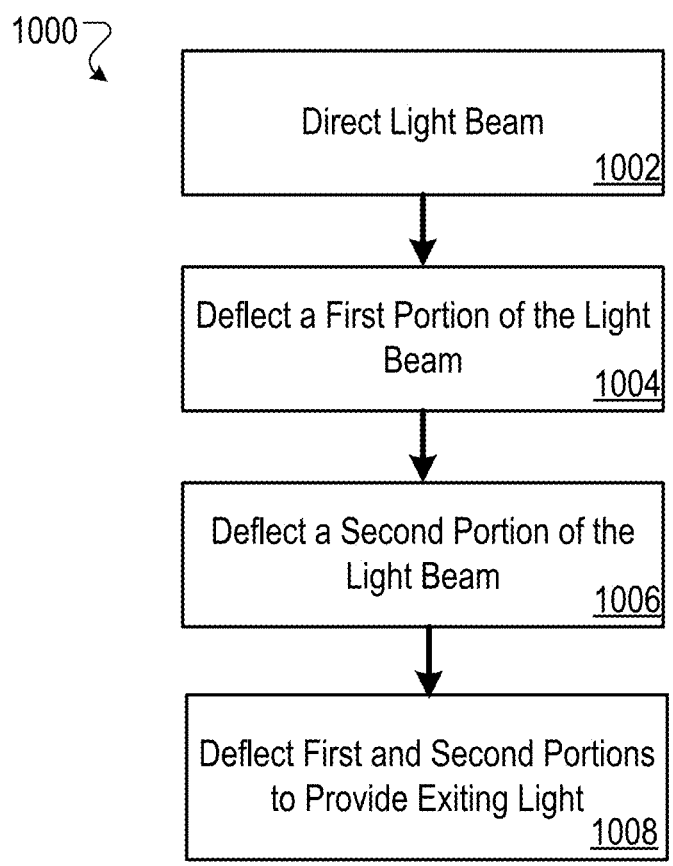
FIG. 10 illustrates an example method for generating virtual content display.

FIG. 10 illustrates an example method for generating a virtual content display. The process 800 is illustrated as a collection of referenced acts arranged in a logical flow graph. The order in which the acts are described is not intended to be construed as a limitation, and any number of the described acts can be combined in other orders and/or in parallel to implement the process.

The light beam 320 is directed to the first side 310 of the eyepiece 300 (1002). In some examples, the light beam 320 is transmitted into the first waveguide 302 of the eyepiece 300. The first portion of the light beam 320 is deflected, by the first diffractive elements 312 of the first waveguide 302, towards the second waveguide 304 of the eyepiece 300 (1004). In some examples, the first portion of the light beam 320 is associated with a first phase of light. The second portion of the light beam 320 is deflected, by the protrusions 308 positioned on the first side 310 of the eyepiece 300, towards the second waveguide 304 of the eyepiece 300 (1006). In some examples, the second portion of the light beam 320 is associated with a second phase of light differing from the first phase. Some of the first and the second portions of the light beam 320 is deflected, by the second diffractive elements 314 of the second waveguide 304, to provide an exiting light beam 330 associated with the virtual image (1008). In some examples, the exiting light beam 330 is based on the first and the second phases.

The invention claimed is:

1. An optical eyepiece for projecting an image, the optical eyepiece comprising:
   an orthogonal pupil expander (OPE) comprising one or more diffractive elements configured to diffract light associated with the image into a first portion of the light;
   protrusions configured to deflect the light associated with the image into a second portion of the light, such that an interference between the first portion of the light and the second portion of the light is obtained; and
   an exit pupil expander (EPE) optically coupled to the OPE and the protrusions, the EPE comprising one or more diffractive elements configured to diffract the first portion of the light and the second portion of the light into a light beam for projecting the image, such that a striation of the image decreases as the obtained interference is decreased,
   wherein:
   the protrusions are associated with one or more parameters,
   at least one of the one or more parameters of the protrusions is tuned such that striation of the image is decreased, and
   the one or more diffractive elements of the OPE and the one or more diffractive elements of the EPE are positioned on a first side of the optical eyepiece, and the protrusions are positioned on a second side of the optical eyepiece opposite to the first side.

2. The optical eyepiece of claim 1, wherein the first portion of the light is associated with a first phase of light and the second portion of the light is associated with a second phase of light different from the first phase.

3. The optical eyepiece of claim 1, wherein the protrusions are configured to deflect the light into the second portion of the light, such that a coherence of the light beam for projecting the image decreases as the obtained interference is decreased.

4. The optical eyepiece of claim 1, wherein the protrusions are further configured to polarize the light associated with the image.

5. The optical eyepiece of claim 1, wherein:
   the protrusions comprise two or more subsets of protrusions,
   the two or more subsets of protrusions are associated with one or more parameters,
   for at least one of the one or more parameters, at least one of the two or more subsets of protrusions differs from at least one other of the one or more subsets, and
   at least one difference between the two or more subsets in at least one of the one or more parameters decreases striation of the image.

6. The optical eyepiece of claim 1, wherein:
   the one or more parameters associated with the protrusions comprise a height of the protrusions, wherein the height of at least one of the protrusions is tuned to minimize striations.

7. The optical eyepiece of claim 1, wherein:
   the one or more parameters associated with the protrusions comprise a shape of the protrusions, wherein the shape of at least one of the protrusions is tuned to minimize striations.

8. The optical eyepiece of claim 1, wherein:
   the one or more parameters associated with the protrusions comprise a height of the protrusions, wherein the density of one or more regions of the protrusions is tuned to minimize striations.

9. An optical eyepiece for projecting an image, the optical eyepiece comprising:
   an orthogonal pupil expander (OPE) comprising one or more diffractive elements configured to diffract light associated with the image into a first portion of the light;
   first protrusions configured to deflect the light associated with the image into a second portion of the light, such that a first interference between the first portion of the light and the second portion of the light is obtained;
   second protrusions configured to deflect the first portion of the light into a third portion of the light, such that a second interference between the first portion of the light and the third portion of the light is obtained; and
   an exit pupil expander (EPE) optically coupled to the OPE and the first protrusions, the EPE comprising one or more diffractive elements configured to diffract the first portion of the light and the second portion of the light, such that the diffracted first portion of the light, the diffracted second portion of the light, and the third portion of the light provide a light beam for projecting the image, and a striation of the image decreases as the first interference and the second interference are decreased,
   wherein:
   the protrusions are associated with one or more parameters, at least one of the one or more parameters of the protrusions is tuned such that striation of the image is decreased, and the one or more diffractive elements of the OPE and the one or more diffractive elements of the EPE are positioned on a first side of the optical eyepiece, and the first protrusions are positioned on a second side of the optical eyepiece opposite to the first side.

10. The optical eyepiece of claim 9, wherein the first protrusions have a first grating orientation and the second protrusions have a second grating orientation different from the first grating orientation.

11. The optical eyepiece of claim 9, wherein the first portion of the light is associated with a first phase of light, the second portion of the light is associated with a second phase of light different from the first phase, and the third portion of the light is associated with a third phase of light different from the first phase and the second phase.

12. The optical eyepiece of claim 9, wherein the second protrusions are further configured to deflect the second portion of the light into a fourth portion of the light, such that a third interference between the second portion of the light and the fourth portion of the light is obtained.

13. The optical eyepiece of claim 12, wherein the light beam for projecting the image includes the fourth portion of the light.

14. A method for projecting an image, the method comprising:
    diffracting, by an orthogonal pupil expander (OPE) comprising one or more diffractive elements, light associated with the image into a first portion of the light;
    deflecting, by protrusions, the light associated with the image into a second portion of the light, such that an interference between the first portion of the light and the second portion of the light is obtained; and
    diffracting, by an exit pupil expander (EPE) comprising one or more diffractive elements that is optically coupled to the OPE and the protrusions, the first portion of the light and the second portion of the light into a light beam for projecting the image, such that a striation of the image decreases as the obtained interference is decreased, wherein:
    the first protrusions and the second protrusions are associated with one or more parameters,
    at least one of the one or more parameters of at least one of the first protrusions and the second protrusions is tuned such that striation of the image is decreased, and
    the one or more diffractive elements of the OPE and the one or more diffractive elements of the EPE are positioned on a first side of an optical eyepiece, and the protrusions are positioned on a second side of the optical eyepiece opposite to the first side.

15. The method of claim 14, wherein the first portion of the light is associated with a first phase of light and the second portion of the light is associated with a second phase of light different from the first phase.

16. The method of claim 14, wherein the deflecting of the light associated with the image into the second portion of the light decreases a coherence of the light beam for projecting the image as the obtained interference is decreased.

17. The method of claim 14, wherein the deflecting of the light associated with the image into the second portion of the light comprises polarizing the light associated with the image.

18. The method of claim 14, further comprising deflecting, by additional protrusions, the first portion of the light into a third portion of the light, such that an interference between the first portion of the light and the second portion of the light is obtained.

19. The method of claim 18, wherein the first portion of the light is associated with a first phase of light, the second portion of the light is associated with a second phase of light different from the first phase, and the third portion of the light is associated with a third phase of light different from the first phase and the second phase.

20. The method of claim 18, further comprising deflecting, by the additional protrusions, the second portion of the light into a fourth portion of the light, such that interference between the second portion of the light and the fourth portion of the light is obtained.

* * * * *